United States Patent
Maerky et al.

(10) Patent No.: US 9,709,003 B2
(45) Date of Patent: Jul. 18, 2017

(54) ACTUATOR DEVICE FOR MOVING A MOVABLE COWL OF A THRUST REVERSER

(71) Applicant: SAGEM DEFENSE SECURITE, Boulogne-Billancourt (FR)

(72) Inventors: Christophe Maerky, Boulogne-Billancourt (FR); Emmanuel Baudin, Boulogne-Billancourt (FR); Lucien Donce, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 15/030,848

(22) PCT Filed: Oct. 23, 2014

(86) PCT No.: PCT/EP2014/072768
§ 371 (c)(1),
(2) Date: Apr. 20, 2016

(87) PCT Pub. No.: WO2015/059234
PCT Pub. Date: Apr. 30, 2015

(65) Prior Publication Data
US 2016/0252049 A1 Sep. 1, 2016

(30) Foreign Application Priority Data
Oct. 24, 2013 (FR) ...................... 13 60409

(51) Int. Cl.
*F16H 25/00* (2006.01)
*F02K 1/76* (2006.01)
(Continued)

(52) U.S. Cl.
CPC .............. *F02K 1/763* (2013.01); *F02K 1/766* (2013.01); *F16H 25/2204* (2013.01);
(Continued)

(58) Field of Classification Search
CPC ...... F02K 1/763; F02K 1/766; F02K 25/2204; F16H 25/2454; F16H 2025/2084; F05D 2250/313
See application file for complete search history.

(56) References Cited

U.S. PATENT DOCUMENTS 2,815,005 A * 12/1957 Geyer ................... F15B 15/261
  92/17
3,597,016 A * 8/1971 Gachot ................... B60T 13/36
  188/265
(Continued)

FOREIGN PATENT DOCUMENTS

WO WO-2008102067 8/2008

OTHER PUBLICATIONS

PCT International Search Report and Written Opinion mailed Feb. 2, 2015, PCT/EP2014/072768, 10 pages.

*Primary Examiner* — David M Fenstermacher
(74) *Attorney, Agent, or Firm* — Blakely Sokoloff Taylor & Zafman LLP

(57) ABSTRACT

The invention relates to an actuator device (8) for moving a movable cowl of a thrust reverser, including: an actuator (12) including a screw (14) and a nut (15) capable of engaging with the screw (14) such that a rotation of the screw relative to the nut translates the nut relative to the screw; a locking device (30) including a locking part (31, 57) which is movable relative to the screw (14) between a locked position in which the locking part (31, 57) prevents the rotation of the screw (14) and an unlocked position in which the locking part (31, 57) allows the rotation of the screw (14), in which the screw (14) includes a body (17) and a lock-inhibiting device (38), the lock-inhibiting device (38) including an inhibiting part (47, 48) which is movable relative to the body (17) between a first position in which the part (47, 48) allows the locking part (31, 47) to move
(Continued)

Figure 1:
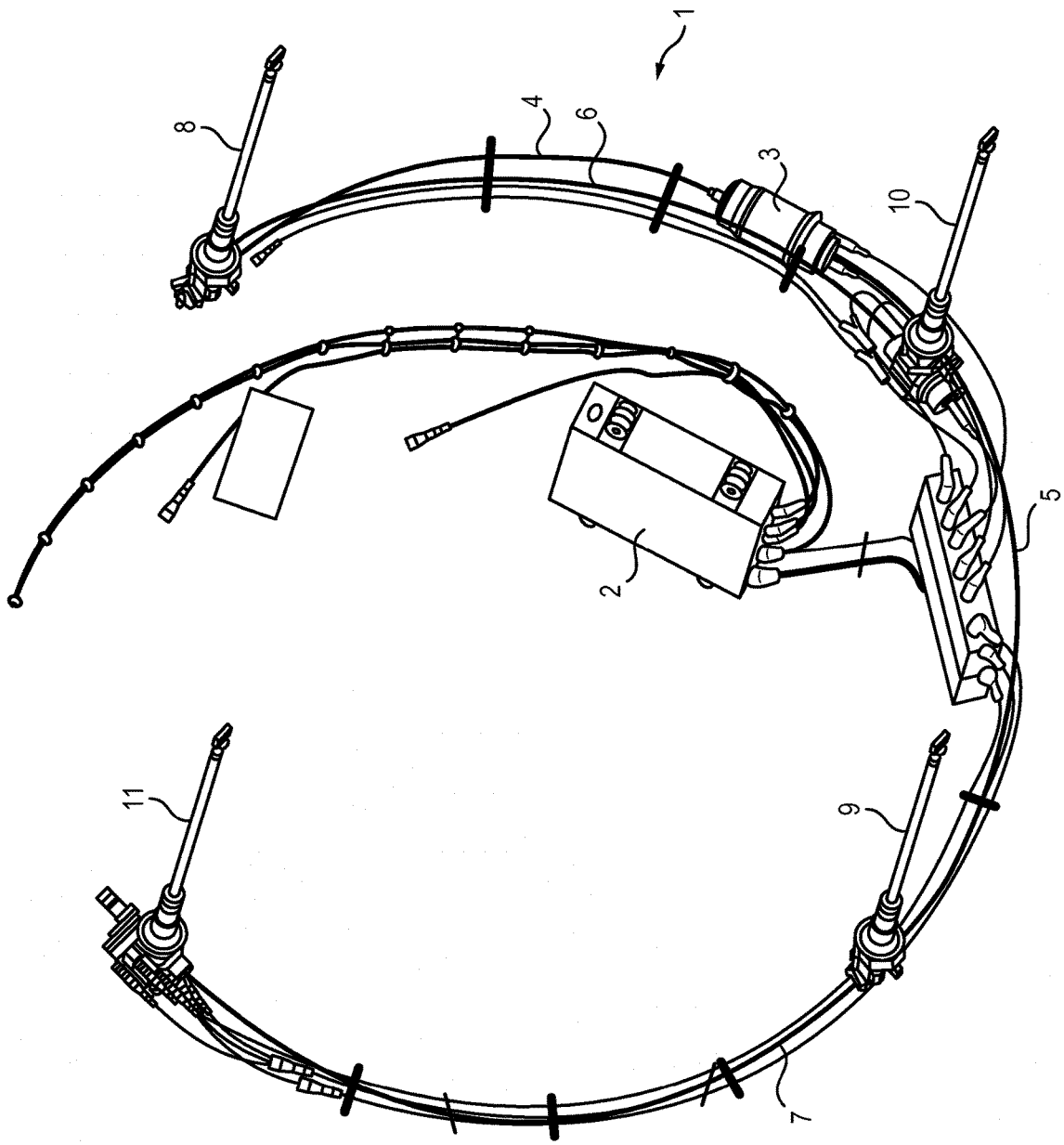

between the locked position and the unlocked position, and a second position in which the inhibiting part (47, 48) prevents the locking part (31, 57) from moving into the locked position.

32 Claims, 7 Drawing Sheets

(51) Int. Cl.
  *F16H 25/24* (2006.01)
  *F16H 25/22* (2006.01)
  *F16H 25/20* (2006.01)
(52) U.S. Cl.
  CPC ... *F16H 25/2454* (2013.01); *F05D 2250/313* (2013.01); *F05D 2250/41* (2013.01); *F05D 2260/52* (2013.01); *F05D 2260/56* (2013.01); *F16H 2025/2084* (2013.01)

(56) References Cited

U.S. PATENT DOCUMENTS

| | | | | |
|---|---|---|---|---|
| 3,621,763 A | * | 11/1971 | Geyer | F15B 11/22 |
| | | | | 244/110 B |
| 4,463,661 A | | 8/1984 | Tootle | |
| 4,543,783 A | * | 10/1985 | Greune | F02K 1/76 |
| | | | | 244/110 B |
| 6,625,973 B1 | | 9/2003 | Langford et al. | |
| 6,786,039 B2 | * | 9/2004 | Chakkera | F02K 1/766 |
| | | | | 239/265.29 |
| 7,007,454 B2 | * | 3/2006 | Dehu | F02K 1/72 |
| | | | | 239/265.29 |
| 9,051,898 B2 | * | 6/2015 | Maalioune | F02K 1/70 |
| 9,086,035 B2 | * | 7/2015 | Jones | F02K 1/763 |
| 9,309,835 B2 | * | 4/2016 | Ko | F02K 1/763 |
| 9,476,384 B2 | * | 10/2016 | Arnaud | F02K 1/763 |
| 2007/0057119 A1 | | 3/2007 | McAuley | |

* cited by examiner

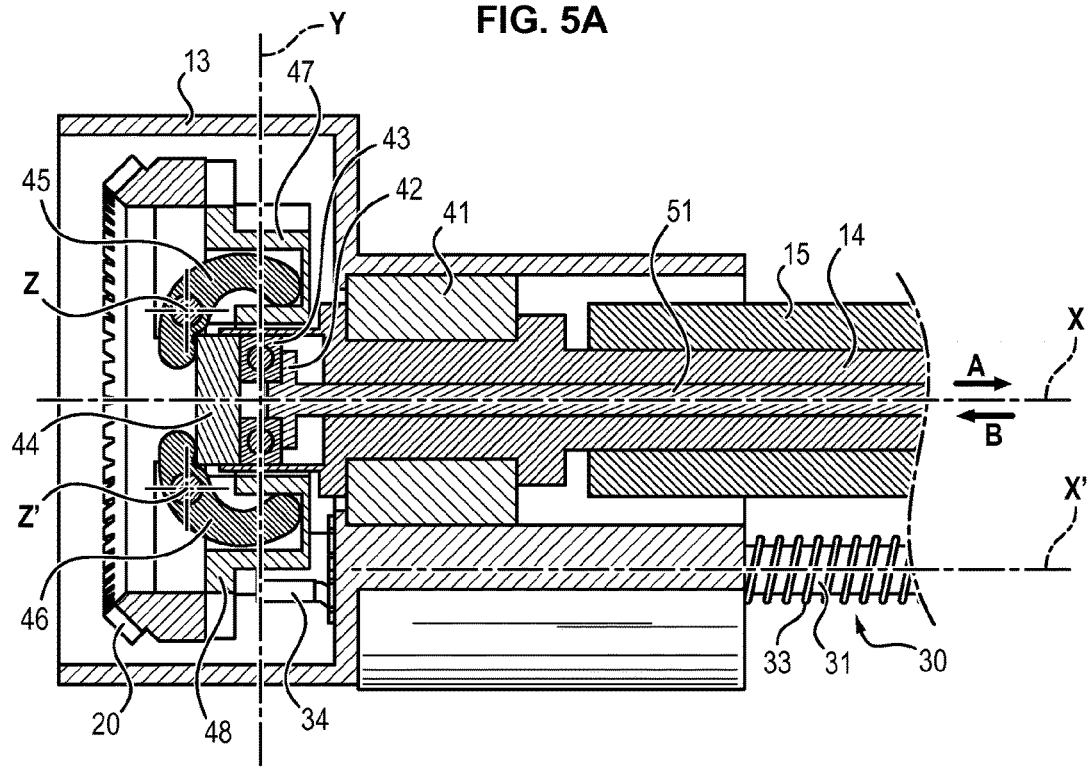
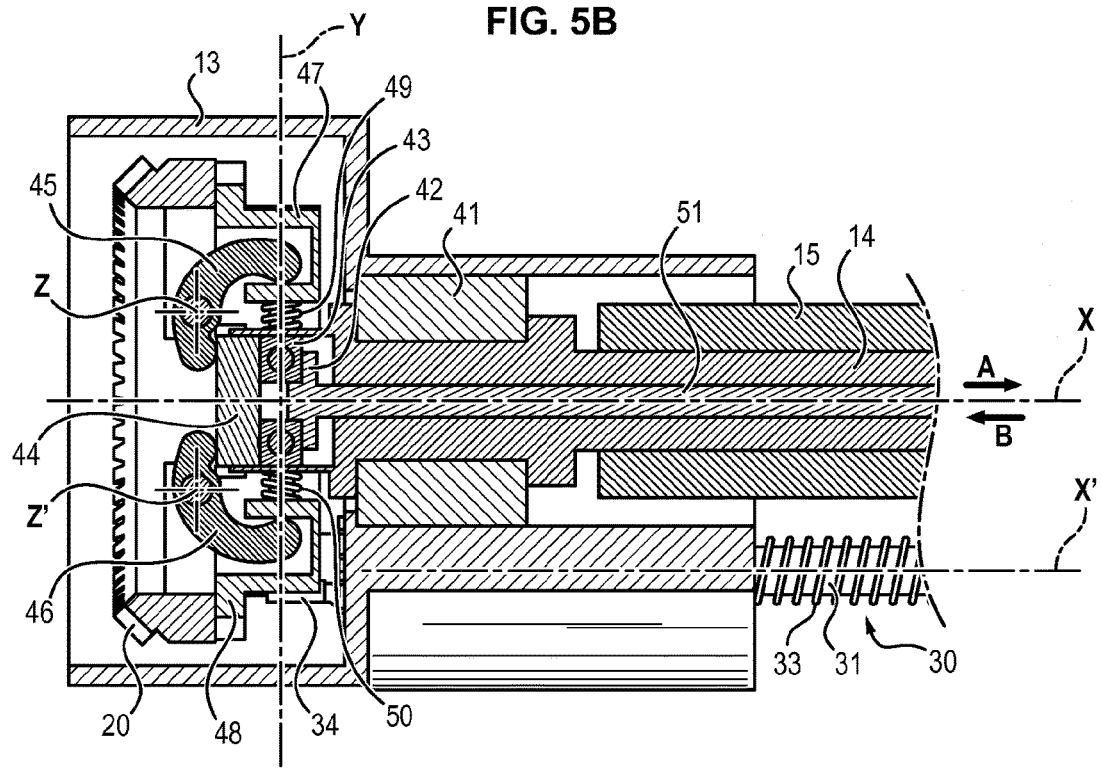

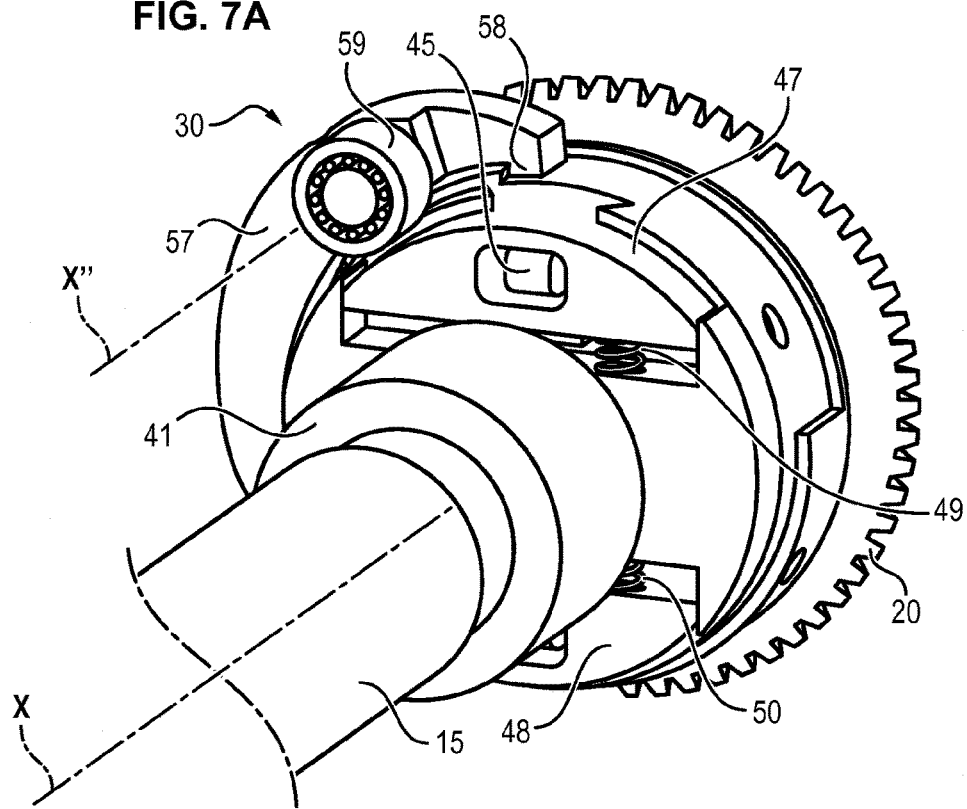
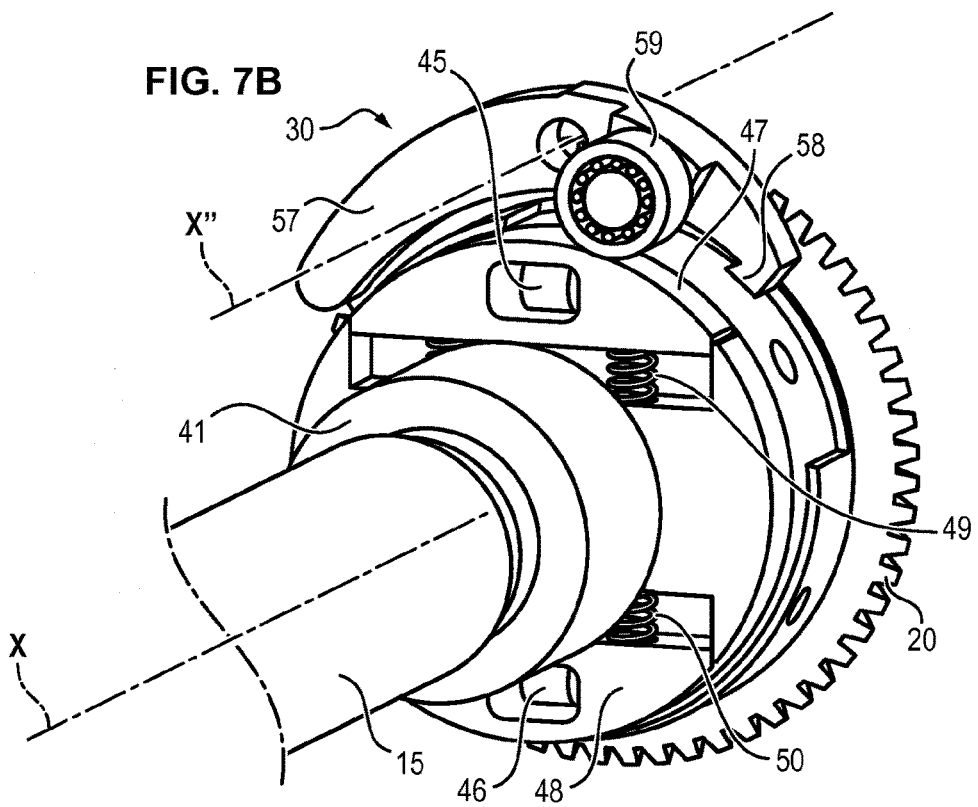

ACTUATOR DEVICE FOR MOVING A MOVABLE COWL OF A THRUST REVERSER

FIELD OF THE INVENTION

The invention relates to an actuation device for displacing a movable cowl of a thrust reverser, as well as an actuator assembly comprising such a device.

PRIOR ART

Propulsive assemblies or PPS (Power Plant Systems) of an airplane generally comprise a nacelle and a turbojet attached to a pylon on a wing or on the fuselage of the airplane. In the case of a turbofan engine turbojet with a high bypass ratio the turbojet comprises a gas generator (high pressure body or CoHP), a low pressure body (or CoBP) a fan and nozzles. The fan allows to accelerate the secondary flow of air circulating in a stream of air in the fan, to generate the thrust necessary for propulsion of the airplane.

The propulsive assemblies of airplanes generally comprise a thrust reverser system or TR allowing the thrust to be reversed during landing so as to improve the braking capacity of the airplane. Such a system comprises a set of movable cowls, actuated by a set of associated actuators, making it possible to temporarily block the stream of air and to deflect the secondary flow of air to the outside and toward the front of the nacelle, thus generating a counter-thrust which is added to braking by the wheels.

In the case of a "door" type thrust reverser system, the nacelle is equipped with movable cowls (called "doors") which pivot with respect to the structure of the nacelle between a retracted position wherein the cowls allow a circulation of the air flow in the stream to the outside and toward the rear of the nacelle and a deployed position wherein the cowls block the stream and reorient the flow of air to the outside and toward the front of the nacelle.

In the case of a "grid" or "cascade" type thrust reverser system, the nacelle is equipped with movable cowls which slide with respect to the structure of the nacelle along rails between a retracted position wherein the cowls allow circulation of the secondary flow in the stream to the outside and toward the rear of the nacelle and a deployed position wherein the cowls uncover grids of deflecting vanes positioned within the thickness of the nacelle and obstruct the stream of air by means of flaps, the actuation whereof is linked to the displacement of the cowls.

Generally, in one case or the other, the movable cowls are actuated by a set of dedicated actuators. Mechanical synchronization of the motion of the actuators is ensured by a synchronization system comprising flexible shafts mechanically interconnecting the actuators.

In addition, thrust reverser systems compulsorily comprise several locking devices allowing to prevent untimely deployment of the cowls during flight. Among the locking devices equipping thrust reverser systems, certain called "primary" locking systems or PLS act on the flexible shaft to block the flexible shaft in rotation.

Document U.S. Pat. No. 6,786,039 describes an actuation device of a thrust reverser comprising an actuator driven in movement between a retracted configuration and a deployed configuration through a drive shaft connected to a flexible shaft. The system comprises a locking device which can be controlled to engage or disengage the drive shaft so as to prevent or allow the rotation of the drive shaft. The system further comprises a locking inhibitor making it possible to hold the locking device in the disengaged position while the actuator is not in the retracted configuration.

SUMMARY OF THE INVENTION

One aim of the invention is to propose an alternative to known devices, and in particular to propose an actuation device which exhibits reduced bulk.

This aim is achieved within the scope of the present invention thanks to an actuation device for displacing a movable cowl of a thrust reverse, comprising:
  an actuator comprising a first element and a second element mounted movable in translation with respect to the first element, one of the first element and the second element being a screw, and the other being a nut capable of cooperating with the screw, so that a rotation of the first element with respect to the second element causes a translation of the second element with respect to the first element,
  a locking device comprising a locking part that is movable with respect to the first element between a locked position wherein the locking part prevents the rotation of the first element and an unlocked position wherein the locking part allows the rotation of the first element,
  wherein the first element comprises a body and a locking inhibiting device, the locking inhibiting device comprising an inhibiting part that is movable with respect to the body between a first position wherein the inhibiting part allows the displacement of the locking part between the locked position and the unlocked position, and a second position wherein the inhibiting part prevents displacement of the locking part toward the locked position.

In the proposed actuation device, the locking inhibiting device is part of the first element. This makes it possible for example to design an actuation device wherein the locking inhibiting device is integrated into the body of the first element.

The device can further have the following features:
  the first element is adapted to be driven in rotation about an axis of rotation X and the inhibiting part is movable in translation with respect to the body in a direction Y radially extending with respect to the axis of rotation X,
  the inhibiting part moves from the first position to the second position by moving away from the axis of rotation X,
  the inhibiting part comprises a drawer slidably mounted within the body,
  the locking inhibiting device comprises a rocker positioned to urge the inhibiting part toward the second position due to the displacement of the second element,
  the rocker is rotatably mounted on the body,
  the device comprises a rod that is movable in translation with respect to the first element and capable of being urged by the second element to displace the inhibiting part toward the first position,
  the movable rod extends at least partially inside the first element,
  the locking inhibiting device comprises an elastic return element positioned to urge the inhibiting part toward the second position,
  in the locked position, the locking part is engaged with the body of the first element,
  the locking part is movable in translation with respect to the body of the first element,
  the locking part is movable in rotation with respect to the body of the first element, the locking device comprises an electromagnet positioned so that, when it is activated, it urges the locking part toward the unlocked position, the locking device comprises an elastic return element positioned so as to urge the locking part toward the locked position, the locking device comprises a roller rotatably mounted on the locking part, by means of which the locking part bears against the inhibiting part, when the inhibiting part is in the second position, the inhibiting part forms with the body a track on which the roller can roll during rotation of the first element, the device comprises a position sensor capable of detecting the position of the locking part, The invention further relates to an actuating assembly for a thrust reverser, comprising:
a plurality of actuation devices as previously defined to displace a movable cowl of the thrust reverser,
a motorized drive unit comprising an electric motor, and
a plurality of flexible shafts connecting the motor to the actuation devices to transmit rotation of the motor to the actuators so as to cause deployment or retraction of the actuation devices.

PRESENTATION OF THE DRAWINGS

Figure 2:
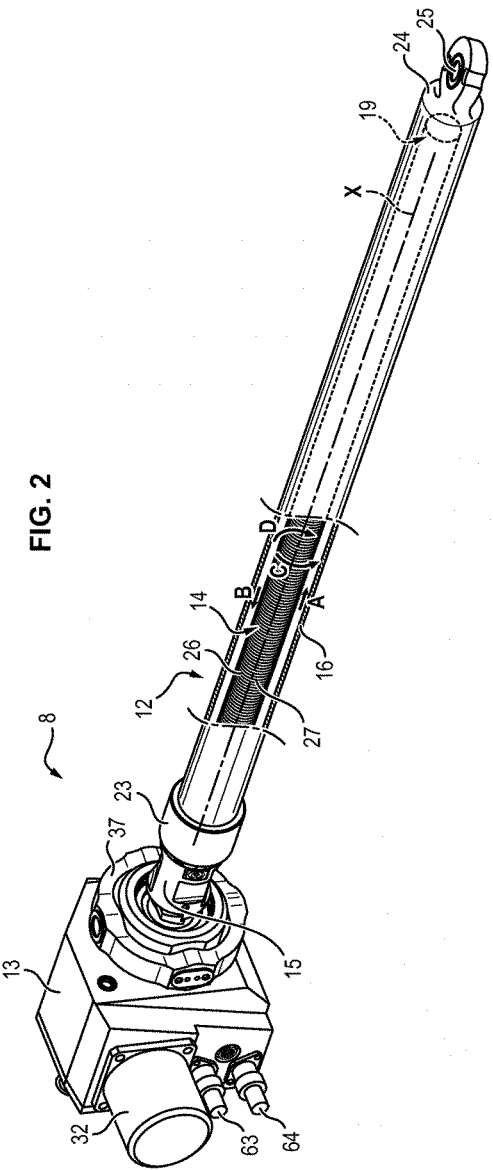
Figure 3:
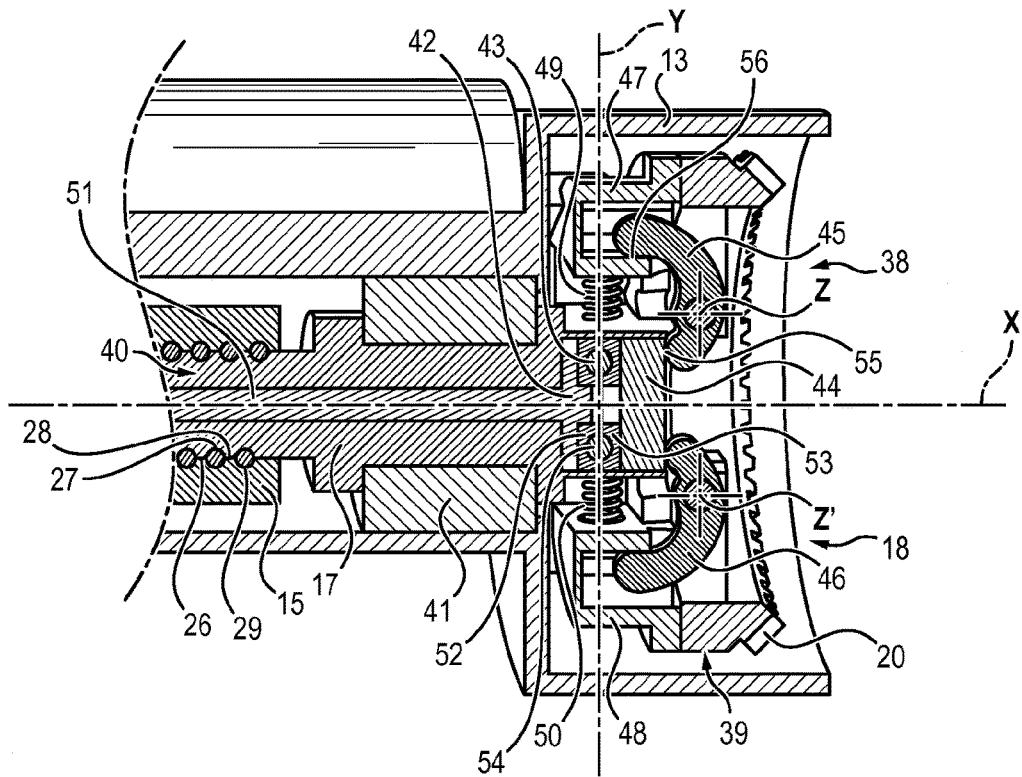
Figure 4:
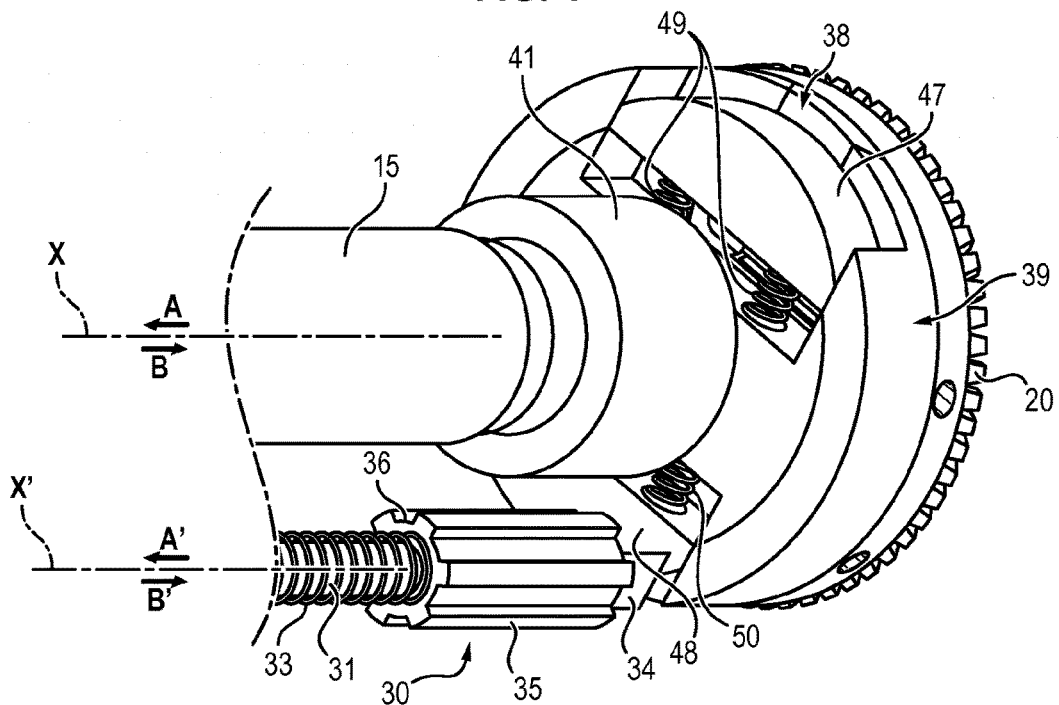
Figure 6A:
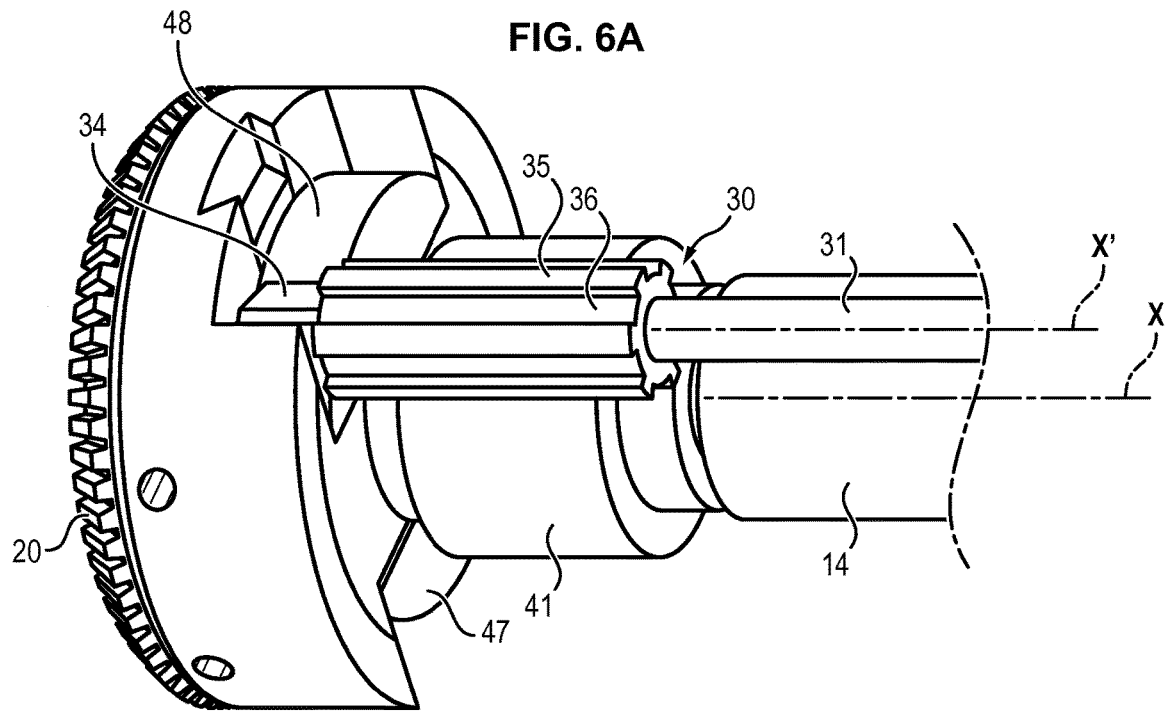
Figure 6B:
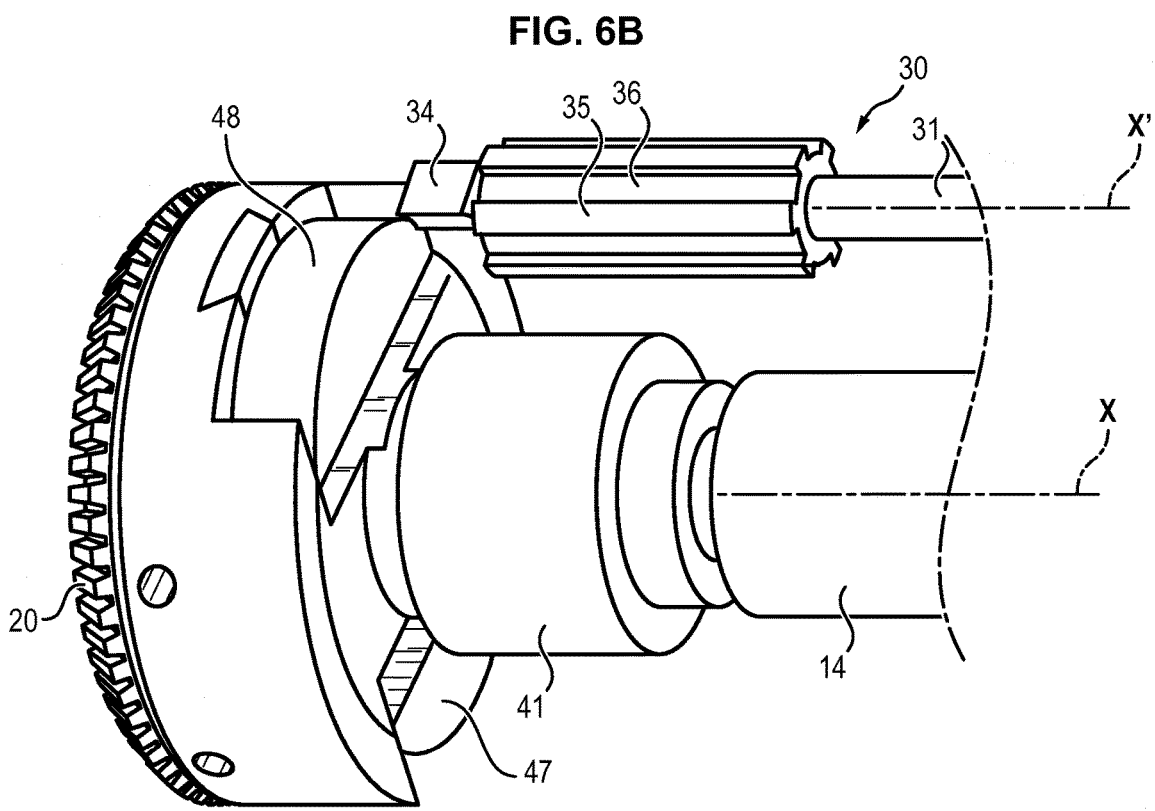
Figure 8A:
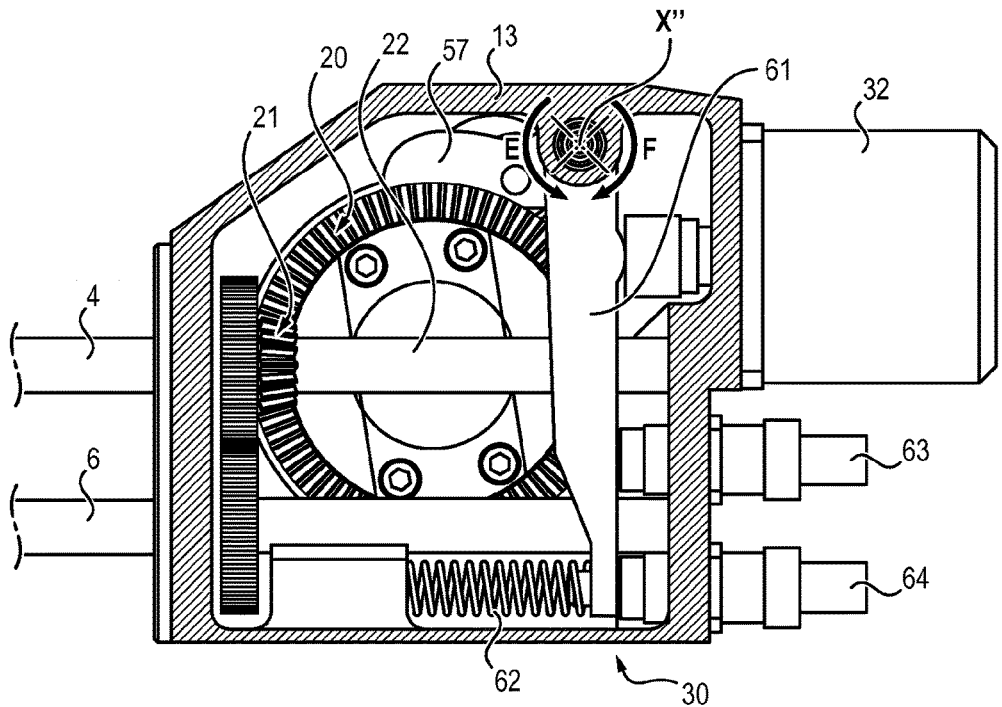
Figure 8B:
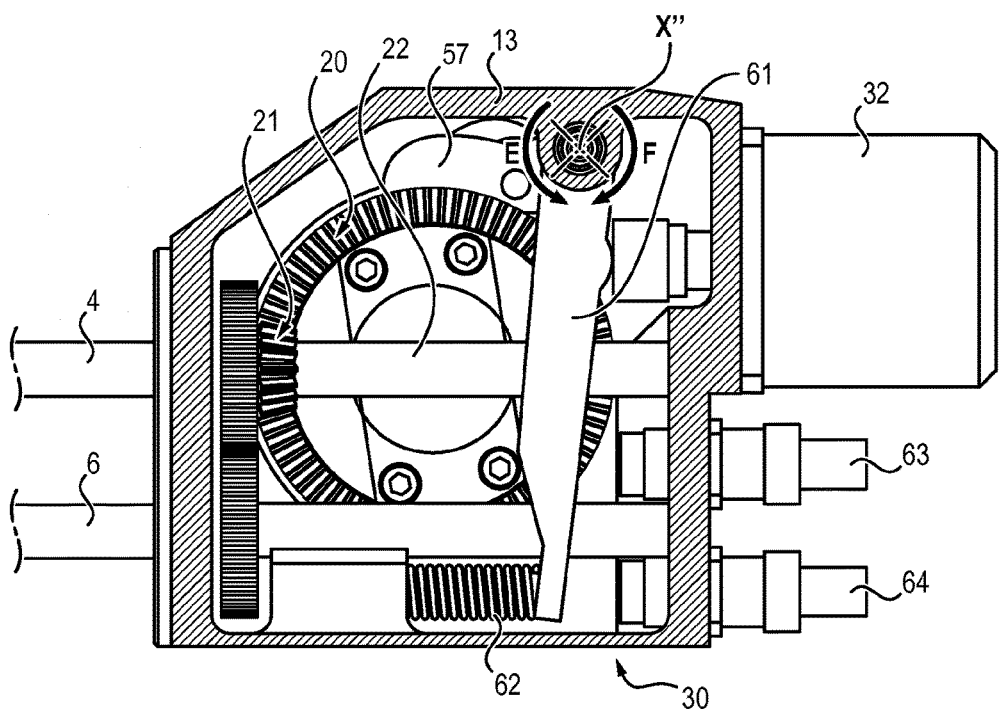

Other features and advantages will still be revealed from the description that follows, which is purely illustrative and not limiting, and should be read with reference to the appended figures wherein:

FIG. 1 shows schematically an actuating assembly for a thrust reverser,

FIG. 2 shows schematically, in perspective, an actuation device according to a first embodiment of the invention, FIG. 3 is a partial view in longitudinal section showing schematically an actuation device according to the first embodiment, FIG. 4 is a partial view, in perspective, showing schematically an actuation device conforming to the first embodiment of the invention, FIGS. 5A and 5B show schematically, in longitudinal section, the actuation device respectively when the device is retracted and when the device is being deployed, FIGS. 6A and 6B show schematically the actuation device respectively when the device is retracted and when the device is being deployed, FIGS. 7A and 7B show schematically an actuation device according to a second embodiment of the invention, respectively when the device is retracted and when the device is being deployed, FIGS. 8A and 8B show schematically the actuation device according to the second embodiment of the invention, respectively when the device is retracted and when the device is being deployed.

DETAILED DESCRIPTION OF ONE EMBODIMENT

In FIG. 1, the actuating assembly 1 for a thrust reverser comprises a thrust reverser control unit 2, a motorized drive unit 3, a plurality of flexible shafts 4 to 7 and a plurality of actuation devices 8 to 11.

Each actuation device 8 to 11 comprises an actuator connected on the one hand to a casing of the turbofan engine (not shown) and on the other hand to a movable cowl of the thrust reverser (not shown) so as to displace the movable cowl with respect to the casing.

The thrust reverser control unit 2 (TRCU) is designed to receive control signals on the part of the full authority digital engine control (FADEC) and to control the motorized drive unit 3 depending on the control signals that it receives.

The motorized drive unit 3 comprises an electric motor positioned to drive in rotation the flexible shafts 4 to 7 so as to cause the deployment or the retraction of the actuation devices 8 to 11.

The right drive flex shaft (RDFS) 4 connects the electric motor to the upper right actuator (URA) of the actuation device 8. The left drive flex shaft (LDFS) 5 connects the electric motor to the lower left actuator (LLA) of the actuation device 9. The right flex shaft (RFS) 6 connects the upper right actuator to the lower right actuator (LRA) of the actuation device 10. The left flex shaft (LFS) 7 connects the lower left actuator to the upper left actuator (ULA) of the actuation device 11.

The four flexible shafts 4 to 7 allows to transmit a rotation displacement generated by the motor of the motorized drive unit 3 to the four actuators, while mechanically synchronizing the displacement of the actuators with one another.

FIGS. 2 to 6B show schematically, in perspective, an actuation device 8 conforming to a first embodiment of the invention.

The actuation device 8 shown comprises an actuator 12 and a locking device 30.

The actuator 12 comprises a casing 13, a screw 14 extending from the casing 13, a nut 15 and an actuator tube 16.

The casing 13 is mounted on the nacelle of the airplane by means of a universal joint 37.

The screw 14 comprises a body 17 and a locking inhibiting device 38 visible in FIGS. 3 and 4.

The body 17 of the screw 14 comprises a head 39 accommodated in the casing 13 and a portion with a generally elongated cylindrical shape 40 extending from the head 39.

The screw 14 is rotatably mounted with respect to the casing 13 by means of a bearing 41 interposed between the screw 14 and the casing 13. The screw 14 is rotatably mounted about an axis of rotation X corresponding to the longitudinal axis of the body 17 and also corresponding to a deployment direction of the actuator 12.

The screw 14 comprises a first end 18 located at the head 39 (or receiving end) designed to receive a driving torque, and a second end 19 opposite to the first end 18. The screw 14 further comprises a bevel input gear 20 mounted integral with the body 17 of the screw 14. The bevel input gear 20 engages with a bevel gearing portion 21 of a drive shaft 22 so as to transmit a rotary displacement of the drive shaft 22 to the screw 14.

The nut 15 extends around the body 17 of the screw 14. The nut 15 is attached to the actuator tube 16. The actuator tube 16 has a first end 23 connected to the nut 15 and a second end 24 connected to the movable cowl, for example through a ball-and-socket joint connection 25.

The nut 15 is mounted movable in translation with respect to the screw 14 along the longitudinal axis X of the screw 14 between two extreme positions respectively corresponding to a retracted configuration and a deployed configuration of the actuator 12. The displacement of the actuator 12 from the retracted configuration to the deployed configuration causes an elongation of the actuator 12 in the deployment direction X.

The body 17 of the screw 14 has a cylindrical outer surface 26 wherein is provided a helical groove 27. The nut 15 has for its part a cylindrical inner surface 28 wherein is also provided a helical groove 29. The screw 14 and the nut 15 cooperate with one another through the helical grooves 27 and 29 wherein balls are accommodated so that a rotation of the screw 14 with respect to the nut 15 causes concomitantly a translation of the nut 15 with respect to the screw 14 along the direction X.

To deploy the actuator 12, the screw 14 is driven in rotation about the axis X in a first direction of rotation so that the nut 15 is displaced along the screw in a first direction (arrow A) going from the first end 19 of the screw 14 toward the second end 20 of the screw 14.

To retract the actuator 12, the screw 14 is driven in rotation about the axis X in a second direction of rotation, opposite to the first direction of rotation, so that the nut 15 is displaced along the screw in a second direction (arrow B) going from the second end 20 of the screw 14 to the first end 19 of the screw 14.

The actuation device 8 comprises a locking device 30.

The locking device 30 comprises a locking part 31, an electromagnet 32 and an elastic return member 33.

The locking part 31 is movable in translation with respect to the screw 14 between a locked position (illustrated in FIG. 6A) and an unlocked position (illustrated in FIG. 6B). The locking part 31 is movable in translation along an axis X' parallel to the axis X of the screw 14.

The electromagnet 32 is a linear electromagnet. When it is activated, the electromagnet 32 drives the locking part 31 by displacing it toward the unlocked position.

The elastic return member 33 comprises a spring arranged to drive the locking part 31 toward the locked position.

The locking part 31 comprises a locking portion 34 and a guiding portion 35.

The locking portion 34 has a generally triangular cross section. When the locking part 31 is in the locked position, the locking portion 34 engages with the head 39 of the screw 14, thus preventing rotation of the screw. When the locking part 31 is in the unlocked position, the locking portion is separated from the head 39 of the screw 14, thus allowing rotation of the screw.

More precisely, the locking portion 34 comprises a locking face capable of abutting a locking face of the head 39 of the screw 14 when the locking part 31 is in the locked position. The locking of the screw 14 is therefore accomplished by a planar contact between the locking part 31 and the screw 14.

As the locking part 31 engages with the body 17 of the screw 14, the force required for unlocking is less than the force needing to be applied if the locking part were engaged with the drive shaft 22 or with the flexible shaft 4 as in the case of the device described in document U.S. Pat. No. 6,786,039.

The guiding portion 35 has longitudinal splines 36 capable of cooperating with splines of the casing 13 along the axis X' to guide the locking part in translation with respect to the casing 13 while still preventing rotation of the locking piece 31 with respect to the casing 13.

As is illustrated in FIGS. 3 and 4, the screw 14 also comprises a locking inhibiting device 38, positioned in the head 39 of the screw 14. The locking inhibiting device 38 has the purpose of holding the locking part 31 in the unlocked position as long as the actuator 12 is not totally retracted, so as to avoid untimely locking of the actuator 12 which could block the actuator during its deployment, particularly during landing.

The locking inhibiting device 38 comprises a first bearing part 42, a ball abutment 43, a second bearing part 44, two rockers 45 and 46, two inhibition parts 47 and 48 (or drawers) and two elastic return elements 49 and 50.

In addition, the screw 14 comprises a movable rod 51 extending inside the elongated cylindrical portion 40 of the body 17. The rod 51 is movable in translation with respect to the body 17 along the direction of the axis X. The movable rod 51 is capable of being driven by the nut 15 when the nut 15 approaches the extreme position corresponding to the retracted configuration of the actuator 12. To this end, the rod 51 has an end connected to the actuator tube 16, the actuator tube 16 itself being integral with the nut 15.

The assembly formed by the first bearing part 42, the ball abutment 43 and the second bearing part 44 is slidably mounted with respect to the body 17 of the screw 14, along the direction X. The first bearing part 42 is capable of being driven by the movable rod 51 when the nut 15 approaches the extreme position corresponding to the retracted configuration of the actuator 12.

The ball abutment 43 comprises a first ring 52 mounted integral with the first bearing part 42, a second ring 53 mounted integral with the second bearing part 44, and balls 54 interposed between the first ring and the second ring. The second ring 53 being able to rotate with respect to the first ring 52 about the axis X, the ball abutment 43 allows rotation of the second bearing part with respect to the first bearing part.

Each rocker 45, 46 is pivotably mounted with respect to the body 17 of the screw 14 about an axis Z, respectively Z', orthogonal to the axis X. Each rocker 45, 46 has an arched shape. Each rocker 45, 46 comprises a first end 55 in contact with the second bearing part 44 and a second end 56 in contact with an associated drawer 47, 48.

Each drawer 47, 48 is slidably mounted in the head 39 of the screw 14. More precisely, each drawer 47, 48 is movable in translation with respect to the body 17 of the screw 14 along a direction Y radially extending with respect to the axis of rotation X of the screw 14. Each drawer 47, 48 is movable in translation between a first position (illustrated in FIG. 5A and 6A) wherein the drawers 47, 48 allow the displacement of the locking part 31 between the locked position and the unlocked position, and a second position (illustrated in FIGS. 5B and 6B) wherein the drawers 47, 48 obstruct the displacement of the locking part 31 toward the locked position.

Each rocker 45, 46 is capable of transforming a translational movement along the axis X of the rod 51 into a translational movement along the direction Y of the drawer 47, 48 with which the rocker 45, 46 is associated. Moreover, each rocker 45, 46 has a shape suited for converting a displacement of the rod 51 in a first run, for example 2 millimeters, into a displacement of each drawer 47, 48 in a second run of greater length than the first run, for example 10 millimeters.

More precisely, when the movable rod 51 drives the first bearing part 42 in the second direction (arrow B), the rockers 45, 46 drive the drawers 47, 48 by moving the drawers 47, 48 closer to the axis X.

Moreover, each elastic return element 49, 50 comprises a spring capable of driving the drawer 47, 48 with which it is associated toward the second position.

When the movable rod 51 is not driving the first bearing part 42, the elastic return elements 49, 50 drive the drawers 47, 48 by separating them from the axis X, which has the effect of causing the rockers 45, 46 to tilt which drive the second bearing part 44 in the first direction (arrow A).

The operation of the actuation device 8 is the following:

Initially, the actuator 12 is in the retracted configuration and the locking part 31 is in the locked position (FIGS. 5A and 6A). In this position, the locking part 31 is engaged with the head 39 of the screw 14 so as to prevent rotation of the screw 14. The locking part 31 is held in the locked position under the influence of the return force exerted by the elastic return element 33. In this position, the locking part 31 prevents untimely deployment of the actuator 12.

Moreover, the drawers 47, 48 are in the first position.

In fact, the nut 15 drives the movable rod 51 in the second direction (arrow B). This has the result that the movable rod 51 drives the drawers 47, 48 toward the first position by means of the first bearing part 42, the ball abutment 43, the second bearing part 44 and the rockers 45, 46.

When the pilot orders the deployment of the thrust reverser, the thrust reverser control unit 2 triggers the supply of power to the electromagnet 32. The electromagnet 32 then applies an unlocking force on the locking part 31 tending to separate the locking part 31 from the head 39 of the screw 14 (arrow A'). The unlocking force applied by the electromagnet 32 opposes the return force exerted by the elastic return element 33, which has the effect of displacing the locking part 31 from the locked position to the unlocked position.

The displacement of the locking part 31 has the effect of disengaging the locking part 34 from the head 39 of the screw 14.

Once the locking part 31 is in the unlocked position (FIGS. 5B and 6B), the actuator 12 can be deployed. Indeed, the locking part 31 is no longer obstructing the rotation of the screw 14.

The control unit 2 activates the motorized drive unit 3, which drives in rotation the screw 14 of the actuator 12 through the flexible shaft 4. The screw 14 is driven in rotation in the first direction (arrow C) so that the nut 15 translates along the screw 14 along the direction X, moving away from the first end 18 (or receiving end) of the screw 14 while approaching the second end 19. The nut 15 displaces along the screw in the first direction (arrow A).

While the nut 15 moves away from the first end 18 of the screw 14, the nut 15 stops driving the movable rod 51. This has the effect that the movable rod 51 stops driving the drawers 47, 48 toward the second position by means of the rockers 45, 46.

The drawers 47, 48 are displaced toward the second position under the influence of the elastic return elements 49, 50.

From that moment on, the electromagnet 32 can be deactivated without preventing the locking part 31 from returning to the locked position. Indeed, the drawer 48 prevents a return of the locking part 31 to the locked position.

This has the consequence that the actuator 2 cannot be locked as long as the nut 15 has not returned to the retracted position.

When the thrust reverser is retracted, the screw 14 of the actuator is driven in rotation in the second direction (arrow D) so that the nut 15 translates along the screw 14 along the direction X toward the first end (or receiving end) of the screw 14 (arrow B). When the nut 15 approaches the first end 18, the nut 15 again drives the movable rod 51 against the rockers 45, 46. The rockers 45, 46 drive the drawers 47, 48 against the elastic return elements 49, 50. Under the influence of the drive exerted by the movable rod 51, the rockers 45, 46, tilt and displace the drawers 47, 48 in translation along the axis Y toward the first position by bringing them closer to the axis X.

When the drawers 47, 48 reach the first position, the drawers 47, 48 no longer obstruct a displacement of the locking part 31 toward the locked position.

Under the influence of the elastic return element 33, the locking part 31 is driven in translation toward the locking position (arrow B'). In other words, the locking part 31 is moved closer to the head 39 of the screw 14 until the locking part 34 engages the head 39 of the screw 14.

In this manner, the complete retraction of the actuator 12 causes an automatic return of the locking part 31 into the locked position. Once the locking part 31 is in the locked position, the locking device 30 can no longer be unlocked, unless the pilot again orders deployment of the thrust reverser, which triggers the activation of the electromagnet 32.

FIGS. 7A, 7B, 8A and 8B show a locking device 30 conforming to a second embodiment of the invention.

In this second embodiment, the actuation device 8 is identical to the actuation device 8 of FIGS. 2 to 6B, excepting that the locking part 57 is rotatably mounted with respect to the casing 13 about an axis X", parallel to the axis X.

The locking part 57 comprises a locking portion 58 shaped like a hook capable of engaging with the head 39 of the screw 14 to prevent rotation of the screw 14.

Moreover, the actuation device 8 comprises a roller 59 rotatably mounted on the locking part 57. The locking part 57 is bearing against the drawer 47 or 48 by means of the roller 59. When the drawers 47 and 48 are in the second position (as is illustrated in FIG. 7B) the drawers 47 and 48 are flush with the outer surface of the had 39 of the screw 14 and thus form with the head 39 of the screw 14 a right circular cylindrical track 60 on which the roller 59 can roll during rotation of the screw 14.

The locking device 30 also comprises a control arm 61 visible in FIGS. 8A and 8B. The control arm 61 is rotatably mounted on the casing 13 and is integral with the locking part 57. The control arm 61 is capable of being driven by the electromagnet 32 in a first direction of rotation (arrow E) to displace the locking part 57 toward the unlocked position. The locking device 30 also comprises an elastic return element 62 capable of driving the control arm 61 in a second direction of rotation (arrow F) opposite to the first direction of rotation, to displace the locking part 57 toward the unlocked position.

Moreover, the actuation device 8 comprises two position sensors 63 and 64 arranged to detect the position of the control arm 61, and consequently the locked or unlocked position of the locking part 57. The position sensors 63 and 64 are mounted on the casing 13. These can be contactless position sensors such as Hall effect sensors. The sensors 63 and 64 are capable of being connected to the thrust reverser control unit 2 so as to transmit to the control unit signals representative of the locked or unlocked state of the actuation device 8.

The operation of the actuation device 8 is similar to the operation of the device of FIGS. 2 to 6B.

Initially, the actuator 12 is in the retracted position and the locking part 57 is in the locked position (FIGS. 7A and 8A). In this position, the locking part 57 is engaged with the head 39 of the screw 14 so as to prevent rotation of the screw 14. The locking part 57 is held in the locked position under the influence of the return force exerted by the elastic return member 62 on the control arm 61. In this position, the locking part 57 prevents untimely deployment of the actuator 12.

Moreover, the drawers 47, 48 are in the first position.

When the pilot orders the deployment of the thrust reverser, the thrust reverser control unit 2 triggers the supply of power to the electromagnet 32. The electromagnet 32 then applies an unlocking force on the locking part 57 by means of the arm 61. The unlocking force applied by the electromagnet 32 opposes the return force exerted by the elastic return element 62, which has the effect of causing the locking part 57 to turn from the locked position to the unlocked position (FIG. 7B and 8B) in the first rotation direction (arrow E).

The rotation of the locking part has the effect of disengaging the locking part 58 from the head 39 of the screw 14.

Once the locking part 57 is in the unlocked position, the actuator 12 can be deployed. Indeed, the locking part 57 no longer obstructs the rotation of the screw 14.

As in the first embodiment, while the nut 15 moves away from the first end 18 of the screw 14, the nut 15 stops driving the movable rod 51. This has the consequence that the movable rod 51 stops driving the drawers 47, 48 toward the second position through the rockers 45, 46. The drawers 47 and 48 are displaced toward the second position under the influence of the elastic return elements 49, 50.

From this moment, the electromagnet 32 can be deactivated without allowing the locking part 57 to return to the locked position. Indeed, the drawer 47 prevents a return of the locking part 57 into the locked position.

The screw 14 is driven in rotation in a first direction of rotation (arrow C), the roller 59 rolls on the track 60 formed by the drawers 47, 48 and the body 17 of the screw 14.

As the drawer 47 prevents the return of the locking part 57 into the locked position, the actuator 2 cannot be locked as long as the nut 15 has not returned to the retracted position.

When the thrust reverser retracts, the screw 14 of the actuator is driven in rotation in the second direction (arrow D) so that the nut 15 translates along the screw 14 along the direction X toward the first end (or receiving end) of the screw 14 (arrow B). Under the influence of the drive exerted by the movable rod 51, the rockers 45, 46 tilt and displace the drawers 47, 48 in translation along the axis Y toward the first position, while bringing them closer to the axis X.

Once in the first position (FIGS. 7A and 8A), the drawers 47, 48 are no longer flush with the outer surface of the head 39 of the screw 14. The locking part 57 resting on the drawers 47, 48 by means of the roller 59, the locking part 57 is driven in rotation toward the locked position (arrow F).

In this manner, the complete retraction of the actuator 12 brings about an automatic return of the locking part 57 into the locked position. Once the locking part 57 is in the locked position, the locking device 30 can no longer be unlocked unless the pilot again orders the deployment of the thrust reverser, which again triggers the activation of the electromagnet 32.

It should be noted that in the proposed actuation device, the locking inhibiting device includes two inhibiting parts arranged with an angular separation of 180 degrees from one another about the axis X and respectively controlled through two rockers. This arrangement has the advantage that the actuation device is insensitive to assembly error (within half a turn) of the actuation tube on the movable cowl of the thrust reverser.

The invention claimed is:

1. An actuation device for displacing a movable cowl of a thrust reverser, comprising:
   an actuator comprising a first element and a second element mounted movable in translation with respect to the first element, one of the first element and the second element being a screw, and the other being a nut capable of cooperating with the screw, so that a rotation of the first element with respect to the second element causes a translation of the second element with respect to the first element,
   a locking device comprising a locking part movable with respect to the first element between a locked position wherein the locking part prevents the rotation of the first element and an unlocked position wherein the locking part allows rotation of the first element,
   wherein the first element comprises a body and a locking inhibiting device, the locking inhibiting device comprising an inhibiting part movable with respect to the body between a first position wherein the inhibiting part allows the displacement of the locking part between the locked position and the unlocked position, and as second position wherein the inhibiting part prevents displacement of the locking part toward the locked position, and
   wherein the first element is adapted to be driven in rotation about an axis of rotation X and the inhibiting part is movable in translation with respect to the body along a direction Y radially extending with respect to the axis of rotation X.

2. The device according to claim 1, wherein the inhibiting part moves from the first position to the second position by moving away from the axis of rotation X.

3. The device according to claim 1, wherein the inhibiting part comprises a drawer slidably mounted in the body.

4. The device according to claim 1, wherein the locking inhibiting device comprises a rocker positioned to urge the inhibiting part toward the second position under the influence of the displacement of the second element.

5. The device according to claim 4, wherein the rocker is rotatably mounted on the body.

6. The device according to claim 5, comprising a rod movable in translation with respect to the first element and capable of being urged by the second element to displace the inhibiting part toward the first position.

7. The device according to claim 6, wherein the movable rod extends at least partially inside the first element.

8. The device according to claim 1, wherein the locking inhibiting device comprises an elastic return element arranged to urge the inhibiting part toward the second position.

9. The device according to claim 1, wherein in the locked position, the locking part is engaged with the body of the first element.

10. The device according to claim 1, wherein the locking part is movable in translation with respect to the body of the first element.

11. The device according to claim 1, wherein the locking part is movable in rotation with respect to the body of the first element.

12. The device according to claim 1, wherein the locking device comprises an electromagnet arranged, when it is activated, to urge the locking part toward the unlocked position.

13. The device according to claim 1, wherein the locking device comprises an elastic return element positioned to urge the locking part toward the locked position.

14. The device according to claim 1, wherein the locking device comprises a roller rotatably mounted on the locking part, by means of which the locking part bears against the inhibiting part.

15. The device according to claim 14, wherein, when the inhibiting part is in the second position, the inhibiting part forms with the body a track on which the roller can roll during rotation of the first element.

16. The device according to claim 1, comprising a position sensor capable of detecting the position of the locking part.

17. An actuating assembly for a thrust reverser, comprising:
- a plurality of actuation devices according to claim 1 for displacing a movable cowl of the thrust reverser,
- a motorized drive unit comprising an electric motor, and
- a plurality of flexible shafts connecting the motor to the actuation devices to transmit a rotation of the motor to the actuators so as to cause deployment or retraction of the actuation devices.

18. An actuation device for displacing a movable cowl of a thrust reverser, comprising:
- an actuator comprising a first element and a second element mounted movable in translation with respect to the first element, one of the first element and the second element being a screw, and the other being a nut capable of cooperating with the screw, so that a rotation of the first element with respect to the second element causes a translation of the second element with respect to the first element,
- a locking device comprising a locking part movable with respect to the first element between a locked position wherein the locking part prevents the rotation of the first element and an unlocked position wherein the locking part allows rotation of the first element,
- wherein the first element comprises a body and a locking inhibiting device, the locking inhibiting device comprising an inhibiting part movable with respect to the body between a first position wherein the inhibiting part allows the displacement of the locking part between the locked position and the unlocked position, and as second position wherein the inhibiting part prevents displacement of the locking part toward the locked position, and
- wherein the locking inhibiting device comprises a rocker rotatably mounted on the body and positioned to urge the inhibiting part toward the second position under the influence of the displacement of the second element.

19. The device according to claim 18, wherein the first element (14) is adapted to be driven in rotation about an axis of rotation X and the inhibiting part (47, 48) is movable in translation with respect to the body (17) along a direction Y radially extending with respect to the axis of rotation X.

20. The device according to claim 18, wherein the inhibiting part moves from the first position to the second position by moving away from the axis of rotation X.

21. The device according to claim 18, wherein the inhibiting part comprises a drawer slidably mounted in the body.

22. The device according to claim 18, comprising a rod movable in translation with respect to the first element and capable of being urged by the second element to displace the inhibiting part toward the first position.

23. The device according to claim 18, wherein the movable rod extends at least partially inside the first element.

24. The device according to claim 18, wherein the locking inhibiting device comprises an elastic return element arranged to urge the inhibiting part toward the second position.

25. The device according to claim 18, wherein in the locked position, the locking part is engaged with the body of the first element.

26. The device according to claim 18, wherein the locking part is movable in translation with respect to the body of the first element.

27. The device according to claim 18, wherein the locking part is movable in rotation with respect to the body of the first element.

28. The device according to claim 18, wherein the locking device comprises an electromagnet arranged, when it is activated, to urge the locking part toward the unlocked position.

29. The device according to claim 18, wherein the locking device comprises an elastic return element positioned to urge the locking part toward the locked position.

30. The device according to claim 18, wherein the locking device comprises a roller rotatably mounted on the locking part, by means of which the locking part bears against the inhibiting part.

31. The device according to claim 30, wherein, when the inhibiting part is in the second position, the inhibiting part forms with the body a track on which the roller can roll during rotation of the first element.

32. The device according to claim 18, comprising a position sensor capable of detecting the position of the locking part.

* * * * *